July 29, 1930.  C. R. RAGSDALE  1,771,817
STEERING GUIDE FOR AUTOMOBILES
Filed Aug. 16, 1929
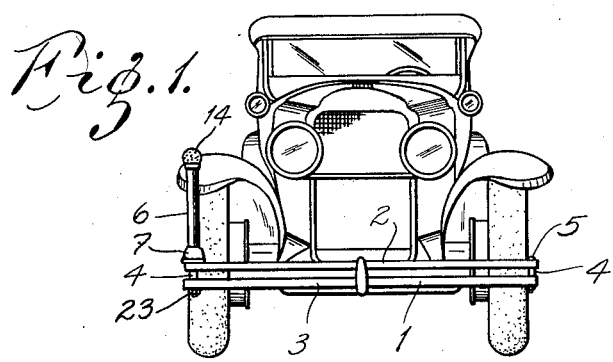
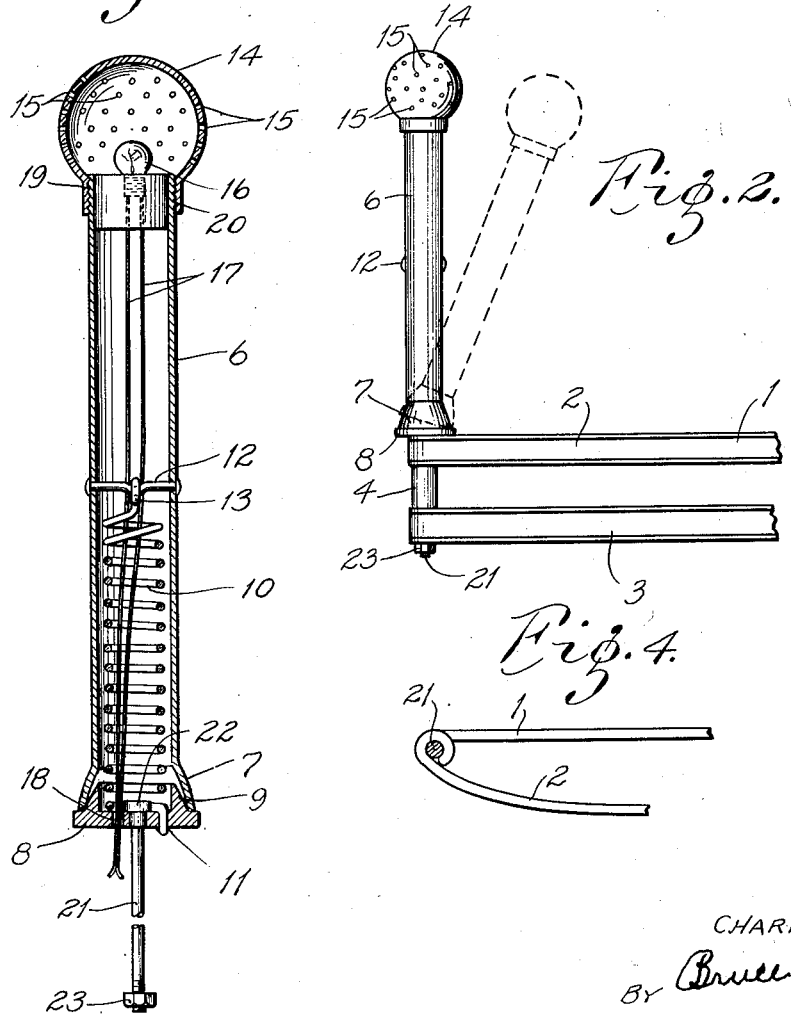
INVENTOR.
CHARLES R. RAGSDALE
BY Bruce S. Elliott
ATTORNEY.

Patented July 29, 1930

1,771,817

UNITED STATES PATENT OFFICE

CHARLES R. RAGSDALE, OF ST. LOUIS, MISSOURI

STEERING GUIDE FOR AUTOMOBILES

Application filed August 16, 1929. Serial No. 386,434.

The general object of this invention is to provide novel means, in the form of an indicator, to enable the driver of a car to more accurately gauge the distance between the sides of parked cars and the right-hand side of his car either in passing such cars or in backing into a parking space adjacent a car.

As is well known, in this country all modern automobiles have the steering wheel located on the left-hand side of the car. When seated behind the steering wheel, an experienced driver can accurately gauge the distance between the left-hand side of his car and the corresponding side of an approaching or parked car, or other object on the roadway to the left of his car. It is very difficult, however, and almost impossible, to so accurately gauge the distance between cars or objects on the roadway positioned to the right of the car. The result is that all but highly expert drivers will invariably, in meeting a car travelling toward them, while at the same time passing a parked car or other object on their right, keep further to the center of the roadway than is necessary, leaving a space of, say, two or three feet between the car or object on the right and passing the meeting vehicle with an intervening space sometimes of only a few inches. Also, in backing into a fairly small space, a driver will often cause the right-hand side of his car to rub the rear fender on the left-hand side of a parked car, because of his inability to accurately gauge the distance between the cars.

A careful observation of a very large number of cars has demonstrated that when a car has a bent or dented mud-guard, it will invariably be on the left-hand side of the car, which fact is due, as I believe, to the difficulty of the average driver to properly gauge distances relative to the right-hand side of his car and to the resultant tendency to steer too close to objects on the left-hand side. This steering difficulty is, of course, due to the fact of the remoteness of the driver from the right-hand side of the car while he is substantially in line with the left-hand side, and to his consequent inability to see the right-hand end of the bumper which, at its ends, projects a greater or less distance beyond the outer sides of the wheels at either side of the car.

To overcome the difficulty in properly steering a car as above set forth, I have conceived the idea of providing a definite steering indicator positioned on and projecting upward from the right-hand end of the bumper and the upper end of which, constituting the steering guide, is visible to the driver both by day and night.

My invention has its preferred embodiment in an upright post mounted at its lower end on the right-hand end of the bumper and of such height that its upper end may be observed by the driver, and in providing a steering guide on the upper end of said post. The steering guide has its preferred embodiment in a hollow perforated head enclosing a light bulb, energized from the battery of the car, the head itself acting as the guide in the daytime, and the light from the bulb shining through the perforations of the head acting as the guide in the night-time. Preferably, also, the steering indicator is mounted for universal movement on the bumper, being held against such movement, however, by the resistance of a strong spring. This arrangement is for the purpose of permitting the steering post to yield upon accidental engagement with other objects, and thus prevent it from being broken off.

In the accompanying drawing—

Figure 1 is a view in front elevation of an automobile showing my invention mounted on the right-hand end of the bumper thereof;

Figure 2 is a view in front elevation on an enlarged scale showing in full lines the right-hand portion of the bumper provided with my improvement, and in dotted lines the steering indicator turned in the position it may occupy when accidentally engaged by another object;

Figure 3 is a vertical sectional view on a still further enlarged scale of my improved steering indicator; and Figure 4 is a sectional plan view of the right-hand end of the bumper shown in Fig. 2, illustrating one of the means for securing the steering indicator to the bumper.

Referring now to the drawing, the numeral 1 indicates a standard type of bumper comprising two parallel metal strips 2, 3, spaced at each end by a cylindrical spacing block 4 through which, and the curved ends of the metal strips 2, 3, passes a bolt 5.

According to my invention, I mount on the right-hand end of the bumper in a manner to be presently described, an upright steering indicator provided at its upper end with a steering guide, and the construction of which I will now describe, referring particularly to Figs. 2 and 3.

The numeral 6 indicates the steering indicator proper which is preferably in the form of a metal tube approximately two inches in outside diameter and about eighteen inches in height. At its lower end, this tube is provided with a socket 7 which is mounted for universal movement on a base 8 which is preferably about three inches in diameter. Projecting upward from the base is a substantially semi-spherical centering member 9, the inner diameter of the base of the socket 7 being substantially the same as the diameter of said centering member 9 at the point where it joins the base. Thus, any lateral movement of the socket on the base is prevented. At the same time, the curvature of the centering member 9 is such that when the steering indicator is canted in one direction or the other, as hereinafter explained, the inner wall of the socket at one side may readily move upward as the steering indicator pivots on the base at its opposite side. The socket member 7 is held in firm engagement with the base by means of a strong coil spring 10 enclosed within the post 6. To this end, the centering member is recessed to receive the lower end of the spring which is secured in any convenient way to the base 8, as indicated at 11, and by a suitable tool inserted in the end of the post 6, it is placed under tension by distending it, and while being held in this condition a bar 12 is passed transversely through suitable apertures in the side walls of the post about centrally thereof and through a hooked end 13 provided on the upper end of the spring. The bar 12 is riveted or otherwise secured in position in the post.

My invention contemplates the provision of a steering guide on the upper end of the post 6, and the preferred form of this guide is that of a hollow metal head 14 provided around its sides with perforations 15 and enclosing a light bulb 16 which is energized by wires 17 passing from the battery through an aperture 18 in the base 8 and through the post 6 to the socket of the light bulb. The head 14 may conveniently be secured on the post 6 by having its lower side provided with a cylindrical screwthreaded portion 19 which is screwed onto the screwthreaded upper end of the post 6, as indicated at 20. The base 8 is centrally apertured and a headed bolt 21 of the desired length and diameter is passed through said aperture and supported on the base by the head 22 thereof.

In applying my steering indicator to the form of bumper illustrated in the drawing, I remove the bolt 5 from the right-hand end of the bumper and pass therethrough the bolt 21 depending from the base 8 of the steering indicator, and secure the same in position by screwing a nut 23 on the bottom thereof.

From an inspection of Fig. 1, it will readily be seen that the driver, in day-time, can use the head 14 as a steering guide, while at night, the head or steering guide 14 is rendered more clearly visible by the light emanating from the bulb 16 and observable through the apertures 15. In either event, he knows that the steering head 14 is in the vertical plane of the extreme right-hand end of the bumper, and is thereby enabled to more accurately gauge the distance between the right-hand side of his car and cars or objects on the corresponding side of the roadway.

The strength of the coil spring 10 is such that no movement of the post 6 will be occasioned by vibrations of the car, such as may be caused by even an extremely rough roadway or by sudden jars or bumps of the car. Moreover, the strength of the spring will prevent any separation between the socket 7 and the base 8, and the base 8 will, of course, be so firmly held to the bumper by screwing up the nut 23 that no relative movement between the base and bumper can occur. Thus, my improved steering indicator will not be a means of producing objectionable noises or rattles when in use on a car.

By observing Figs. 1 and 2, it will readily be seen that in the event the post 6 should be brought into contact with some object, such as some part of a parked car, the door of a garage, or the like, it can yield a considerable distance in any direction and thus, in all but extreme cases, be prevented from being broken off of the bumper. In such movement of the steering post, the bottom edge of the socket will pivot on the base at any point, according to the direction of impact with the object, and the opposite side of the socket will rise from the base against the tension of the spring and move up over the centering member. As soon as pressure is removed from the post it will at once be restored to normal position on the base 8 by the power of the spring 10.

It has been my observation that bumpers of the general type illustrated are those most generally in use. I am aware of the fact that there are many other forms of bumpers, and it is obvious, and within the realm of mechanical skill, to provide appropriate means for securing the base 8 to the ends of other forms of bumpers.

While I have illustrated the preferred embodiment of my invention, I wish it understood that various changes in form, construction and proportion of parts could be made without departing from the spirit and scope of my invention as outlined in the following claims.

I claim:

1. A steering indicator for automobiles, comprising a base and a relatively fixed upright member mounted thereon and capable of pivotal movement in any direction under pressure.

2. A steering indicator for automobiles, comprising a base and a relatively fixed upright member spring-anchored thereon and capable of pivotal movement in any direction under exerted pressure for universal movement.

3. A steering indicator for automobiles, comprising a base having a centering member thereon, an upright post having a socket at its lower end surrounding said centering member and mounted on said base for universal movement, and a coil spring anchored at one end to said post and at its other to said base.

4. A steering indicator for automobiles, comprising a base having a centering member thereon, an upright hollow post provided with a socket at its lower end surrounding said centering member and mounted on said base for universal movement, and a coil spring encased in said post and anchored at its upper end thereto and at its lower end to said base.

5. A steering indicator for automobiles, comprising a base having a centering member thereon, an upright hollow post provided with a socket at its lower end surrounding said centering member and mounted on said base for universal movement, and a coil spring normally under tension encased in said post and anchored at its upper end thereto and at its lower end to said base.

6. A steering indicator for automobiles, comprising a base having a centering member thereon, an upright hollow post provided with a socket at its lower end surrounding said centering member and mounted on said base for universal movement, a bar extending transversely through said post intermediate its ends and secured in opposite walls thereof, and a coil spring normally under tension encased in said post and anchored at its upper end to said bar and at its lower end to said base.

7. A steering indicator for automobiles, comprising a base, a relatively fixed upright member mounted thereon and capable of pivotal movement in any direction under exerted pressure, and a steering guide mounted on the upper end of said post.

8. A steering indicator for automobiles, comprising a base, a relatively fixed upright member mounted thereon and capable of pivotal movement in any direction under exerted pressure, and a light bulb visibly enclosed on the upper end of said post.

9. A steering indicator for automobiles, comprising a base, a relatively fixed upright member mounted thereon and capable of pivotal movement in any direction under exerted pressure and provided with a hollow perforated head at its upper end, and a light bulb enclosed in said head.

10. In combination with the bumper of an automobile, an upright steering post fixedly secured on the right-hand end of said bumper and of such height that its upper end may be observed by the driver.

11. In combination with the bumper of an automobile, an upright post fixedly secured on the right-hand end of said bumper and of such height that its upper end may be observed by the driver, and a fixed steering guide mounted on the upper end of said post.

12. In combination with the bumper of an automobile, a relatively fixed post mounted on the right-hand end of said bumper and of such height that its upper end may be observed by the driver, and a light bulb mounted on the upper end of said post.

13. In combination with the bumper of an automobile, a relatively fixed post mounted on the right-hand end of said bumper and of such height that its upper end may be observed by the driver, and a visibly enclosed light bulb mounted on the upper end of said post.

14. In combination with the bumper of an automobile, a base secured on the right-hand end of said bumper and having a centering member on its upper side, an upright steering post having a socket at its lower end surrounding said centering member and mounted at its lower end on said base for pivotal movement in any direction, said steering post being of such height that its upper end may be observed by the driver, and a steering guide provided on the upper end of the steering post.

15. In combination with the bumper of an automobile, a base secured on the right-hand end of said bumper and having a spherical centering member on its upper side, an upright hollow post provided at its lower end with a socket surrounding said centering member and mounted on said base for pivotal movement in any direction, a coil spring normally under tension encased in said post and anchored at its upper end thereto and at its lower end to said base, said post being of a height such that its upper end may be observed by the driver, a hollow perforated head mounted on the upper end of said post, and a light bulb mounted in said head.

In testimony whereof, I have hereunto set my hand.

CHARLES R. RAGSDALE.